United States Patent [19]

Asars et al.

[11] Patent Number: 5,043,632

[45] Date of Patent: Aug. 27, 1991

[54] TFEL EDGE EMITTER STRUCTURE WITH UNIFORM LIGHT EMISSION FILTER

[75] Inventors: Juris A. Asars, Murrysville Boro; David Leksell, Oakmont, both of Pa.

[73] Assignee: Westinghouse Electric Corp., Pittsburgh, Pa.

[21] Appl. No.: 508,457

[22] Filed: Apr. 13, 1990

[51] Int. Cl.⁵ .............................................. G09G 3/30
[52] U.S. Cl. .................................. 315/169.3; 340/781
[58] Field of Search .......................... 315/169.1, 169.3; 340/781, 766, 767; 313/498

[56] References Cited

U.S. PATENT DOCUMENTS

| | | | |
|---|---|---|---|
| 3,659,149 | 4/1972 | Fleming | 315/169.3 X |
| 3,710,181 | 1/1973 | Tanaka et al. | 315/169.1 X |
| 4,001,619 | 1/1977 | Endriz et al. | 340/781 X |
| 4,006,383 | 2/1977 | Luo et al. | 315/169 TV |
| 4,044,345 | 8/1977 | Ueda et al. | 340/781 |
| 4,110,664 | 8/1978 | Asars et al. | 315/169 TV |
| 4,464,602 | 8/1984 | Murphy | 313/509 |
| 4,535,341 | 8/1985 | Kun et al. | 346/107 R |
| 4,734,723 | 3/1988 | Ishitobi | 346/160 |
| 4,807,047 | 2/1989 | Sato et al. | 358/300 |
| 4,874,986 | 10/1989 | Menn et al. | 315/169.3 X |
| 4,877,995 | 10/1989 | Thioulouse et al. | 315/169.3 X |
| 4,882,517 | 11/1989 | Maruyama et al. | 315/169.3 X |
| 4,885,448 | 12/1989 | Kasner et al. | 219/121.69 |
| 4,899,184 | 2/1990 | Leksell et al. | 346/155 |
| 4,951,064 | 8/1990 | Kun et al. | 346/107 R |

FOREIGN PATENT DOCUMENTS 63-91998 4/1988 Japan .

Primary Examiner—Eugene R. LaRoche
Assistant Examiner—Do Hyun Yoo
Attorney, Agent, or Firm—John K. Williamson

[57] ABSTRACT

A TFEL edge emitter structure with an EL stack having a linear array of spaced-apart pixels with front edge faces emitting light of non-uniform intensity from different regions has an uniform light emission filter provided across the light-emitting faces of the pixels. The filter takes the form of an exposed photographic emulsion coated directly to the light-emitting faces of the pixels. Alternatively, the filter takes the form of a separate substrate containing the exposed photographic emulsion mounted across the light-emitting faces of the pixels. The exposed emulsion is darker at regions thereof which correspond to regions of the light-emitting edge faces of the pixels with higher original light intensity and lighter at regions thereof which correspond to regions of the light-emitting edge faces of the pixels with lower original light intensity. The final exposed emulsion reduces the original non-uniform intensity of the light from the different regions of the pixel light-emitting faces to an uniform level equal to that of the lowest original light intensity of the pixel light-emitting faces. A focussing lens can be combined with the edge emitter structure. The filter emulsion is exposed so as to compensate not only for non-uniformity of light intensity of the structure but also for optical non-uniformities of the lens.

15 Claims, 4 Drawing Sheets

TFEL EDGE EMITTER STRUCTURE WITH UNIFORM LIGHT EMISSION FILTER

CROSS REFERENCE TO RELATED APPLICATIONS

Reference is hereby made to the following copending U.S. applications dealing with related subject matter and assigned to the assignee of the present invention:

1. "A Thin Film Electroluminescent Edge Emitter Structure On A Silicon Substrate" by Z. K. Kun et al, assigned U.S. Ser. No. 273,296 and filed Nov. 18, 1988, and now U.S. Pat. No. 5,004,956 issued on Apr. 2, 1991, a continuation-in-part of U.S. Ser. No. 235,143, filed Aug. 23, 1988.

2. "Process For Defining An Array Of Pixels In A Thin Film Electroluminescent Edge Emitter Structure" by W. Kasner et al, assigned U.S. Ser. No. 254,282 and filed Oct. 6, 1988, and now U.S. Pat. No. 4,885,448 issued on Dec. 5, 1989.

3. "A Multiplexed Thin Film Electroluminescent Edge Emitter Structure And Electronic Drive System Therefor" by D. Leksell et al, assigned U.S. Ser. No. 343,697 and filed Apr. 24, 1989, and now U.S. Pat. No. 4,899,184 issued on Feb. 6, 1990.

4. "A Thin Film Electroluminescent Edge Emitter Assembly And Integral Packaging" by Z. K. Kun et al, assigned U.S. Ser. No. 351,495 and filed May 15, 1989, and now U.S. Pat. No. 4,951,064 issued on Aug. 21, 1990.

5. "Thin Film Electroluminescent Edge Emitter Structure With Optical Lens And Multi-Color Light Emission Systems" by Z. K. Kun et al, assigned U.S. Ser. No. 353,316 and filed May 17, 1989, a continuation-in-part of U.S. Ser. No. 280,909, filed Dec. 7, 1988, now abandoned, which is a continuation-in-part of U.S. Ser. No. 248,868, filed Sept. 23, 1988, now abandoned.

6. "Integrated TFEL Flat Panel Face And Edge Emitter Structure Producing Multiple Light Sources" by Z. K. Kun et al, assigned U.S. Ser. No. 377,690 and filed July 10, 1989.

7. "Multi-Layer Structure And Method Of Constructing The Same For Providing TFEL Edge Emitter Modules" by D. Leksell et al, assigned U.S. Ser. No. 434,397 and filed Nov. 13, 1989.

8. "TFEL Edge Emitter Module And Packaging Assembly Employing Sealed Cavity Capacity Varying Mechanism" by Norman J. Phillips et al, assigned U.S. Ser. No. 07/434,392 and filed Nov. 13, 1989.

BACKGROUND OF THE INVENTION

1. Field of the Invention

The present invention relates generally to an electronically controlled, high resolution light source, and more particularly, to a light-emitting edge structure having an uniform light emission filter.

2. Description of the Prior Art

Electroluminescence is a phenomena which occurs in certain materials from the passage of an electric current through the material. The electric current excites the electrons of the dopant in the light emitting material to higher energy levels. Emission of radiation thereafter occurs as the electrons emit or give up the excitation energy and fall back to lower energy levels. Such electrons can only have certain discrete energies. Therefore, the excitation energy is emitted or radiated at specific wavelengths depending on the particular material.

TFEL devices that employ the electroluminescence phenomena have been devised in the prior art. It is well known to utilize a TFEL device to provide an electronically controlled, high resolution light source. One arrangement which utilizes the TFEL device to provide the light source is a flat panel display system, such as disclosed in U.S. Patents to Asars et al (U.S. Pat. No. 4,110,664) and Luo et al (U.S. Pat. No. 4,006,383), assigned to the assignee of the present invention. In a TFEL flat panel display system, light emissions are produced substantially normal to a face of the device and so provide the light source at the device face. Another arrangement utilizing the TFEL device to provide the light source is a line array, or edge, emitter, such as disclosed in a U.S. Patent to Kun et al (U.S. Pat. No. 4,535,341), also assigned to the assignee of the present invention. In a TFEL edge emitter system, light emissions are produced substantially normal to an edge of the TFEL device and so provide the light source at the device edge. Edge emissions by the TFEL edge emitter system are typically 30 to 40 times brighter than the face emissions by the TFEL flat panel display system under approximately the same excitation conditions.

From the above discussion, it can be appreciated that the TFEL edge emitter system of the Kun et al patent potentially provides a high resolution light source promising orders of magnitude of improved performance over the TFEL flat panel face emitter system in terms of light emission brightness. For the TFEL edge emitter device to be able to reach its full commercial potential, it must be capable of use in applications, such as electrophotographic printing, which demand uniformity of light emission across the face of the device defined by the multiplicity of individual light-emitting faces of the pixels of the device.

However, using present manufacturing techniques, a large fraction of TFEL edge emitter devices are produced with deviations preventing them from meeting pixel-to-pixel light emission uniformity requirements for such applications. If only the small fraction of devices which meet light emission uniformity standards can be used in these application, then production costs will be substantially increased by this lower yield.

Consequently, a need exists for a way to compensate for the deviations in light emissions of the large fraction of TFEL edge emitter devices which fail to attain uniformity standards.

SUMMARY OF THE INVENTION

The present invention relates to a light-emitting edge structure having an uniform light emission filter designed to satisfy the aforementioned needs. The uniform light emission filter can take the form of an exposed photographic emulsion deposited or applied directly to the light-emitting face of the edge structure. Alternatively, the uniform light emission filter can take the form of a separate substrate containing the exposed photographic emulsion, such as an exposed negative film, mounted across the light-emitting face of the edge structure.

Accordingly, the present invention is directed to the combination of an uniform light emission filter and a light-emitting edge structure having an edge face emitting light of non-uniform intensity from different regions of the face. The filter comprises an exposed photographic emulsion disposed adjacent to the light-emitting edge face of the structure. The emulsion is darker at regions thereof which correspond to regions of the light-emitting edge face of the structure which emit light of higher relative intensity and lighter at regions thereof which correspond to regions of the light-emitting edge face of the structure which emit light of lower relative intensity such that the exposed emulsion reduces the non-uniform intensity of light emitted by the different regions of the edge face of the structure to an uniform level equal to that of the lowest light intensity thereof. In one form, the emulsion is coated directly on the light-emitting face of the edge structure. In an alternative embodiment, a separate substrate contains the exposed photographic emulsion and is mounted across the light-emitting face of the edge structure.

The present invention also is directed to the combination of the above-defined uniform emission filter and a TFEL edge emitter structure with an EL stack having a light-emitting front edge face. Also, a focussing lens can be combined with the edge emitter structure and the emulsion of the filter exposed so as to compensate not only for non-uniformity of light intensity of the structure but also for optical non-uniformities of the focussing lens.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DESCRIPTION OF THE PREFERRED EMBODIMENTS

In General

Figure 1:
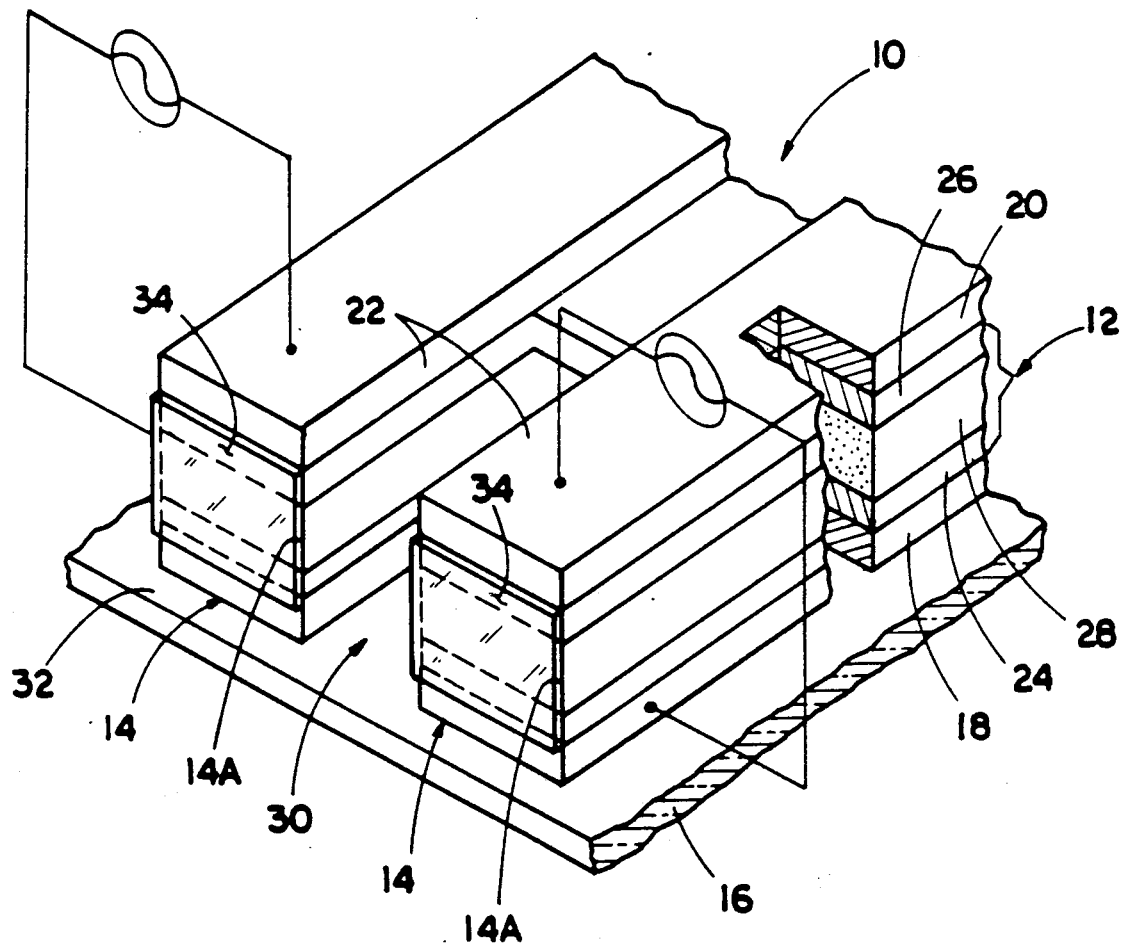
FIG. 1 is a fragmentary perspective view of a TFEL edge emitter structure with one embodiment of a uniform light emission filter in accordance with the present invention.
Figure 2:
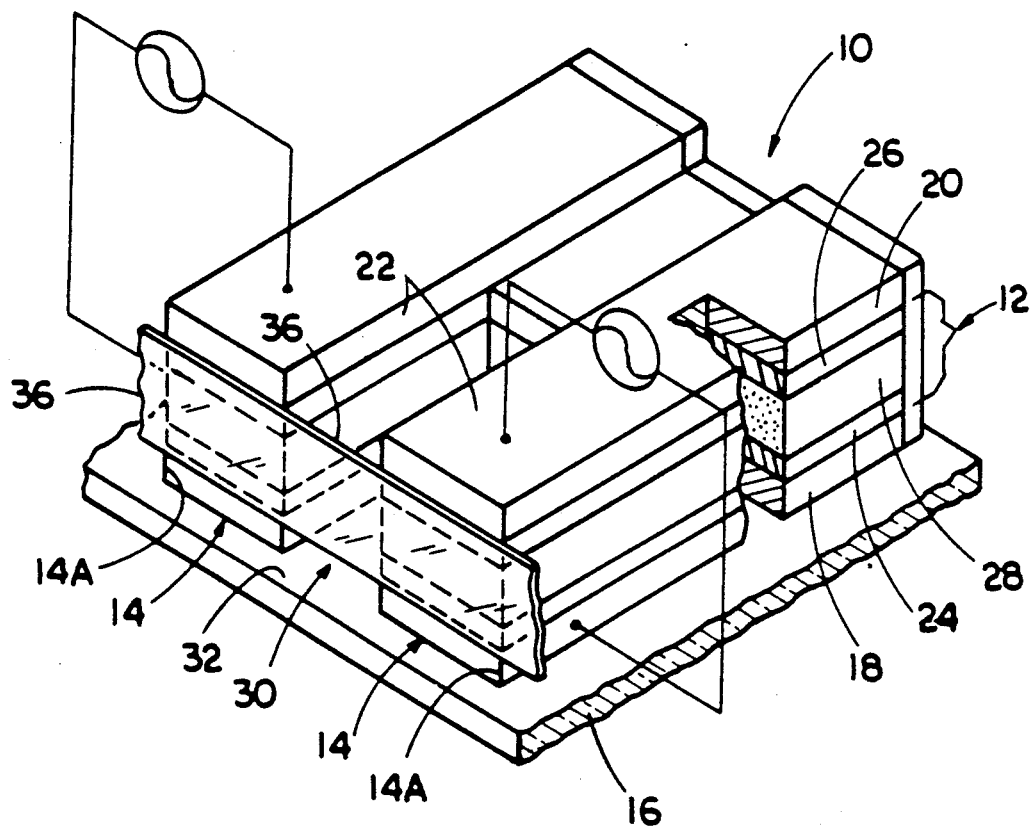
FIG. 2 is a fragmentary perspective view of the TFEL edge emitter structure with another embodiment of the uniform light emission filter in accordance with the present invention.

Referring to the drawings, and particularly to FIGS. 1 and 2, there is illustrated a TFEL edge emitter structure, generally designated 10. The structure 10 is substantially similar in construction to the one disclosed and illustrated in the fourth patent application cross-referenced above, the disclosure of which is incorporated herein by reference. The basic construction of the structure 10 need and will only be described herein to the extent necessary to foster a complete and thorough understanding of the present invention.

As is well-known, the TFEL edge emitter structure 10 employs an electroluminescent (EL) stack 12 having a linear array of spaced-apart pixels 14 with light-emitting front edge faces 14A. The TFEL edge emitter structure 10 provides a solid state, electronically controlled, high resolution light source.

The TFEL edge emitter structure 10 includes a bottom substrate layer 16, preferably fabricated of a glass material, a lower common electrode layer 18 applied over the bottom substrate layer 16, an upper electrode layer 20 composed of a plurality of upper control electrode elements 22, and the middle EL light-energy generating stack 12 disposed between the lower common electrode 18 and the upper control electrode elements 22. The middle EL stack 12 includes a lower dielectric layer 24, an upper dielectric layer 26, and a middle light-energy generating layer 28. The lower dielectric layer 24, preferably composed of silicon oxide nitride, overlies the lower common electrode layer 18 and bottom substrate layer 16. Next, the middle light-energy generating layer 28, preferably composed of a phosphor material such as zinc sulfide doped with manganese, is deposited over the lower dielectric layer 24. Then, the upper dielectric layer 26, composed of the same material as the lower dielectric layer 24, is deposited over the middle light-energy generating layer 28.

It should be understood that although the EL stack 12 is illustrated including lower and upper dielectric layers 24, 26, either dielectric layer may be eliminated from the EL stack 12 if desired. If the lower dielectric layer 24 is not included in the EL stack 12, then it is apparent that the phosphor layer 28 will be interposed between the lower common electrode layer 18 and the upper dielectric layer 26.

The linear array of pixels 14 of the EL stack 12, which also include the lower common and upper control electrode layers 18, 20, are defined by a series of longitudinal channels 30 and a transverse street 32 connecting the channels 30 on the forward end of the EL stack 12 and electrode layers 18.20 down to the level of the bottom substrate layer 16 The channels 30 serve to optically isolate adjacent pixels 14 from one another to prevent optical cross-talk. The street 32 is provided as a result of the formation thereabove of the front light-emitting edge faces 14A of the pixels 14.

Uniform Light Emission Filter

Figure 3:
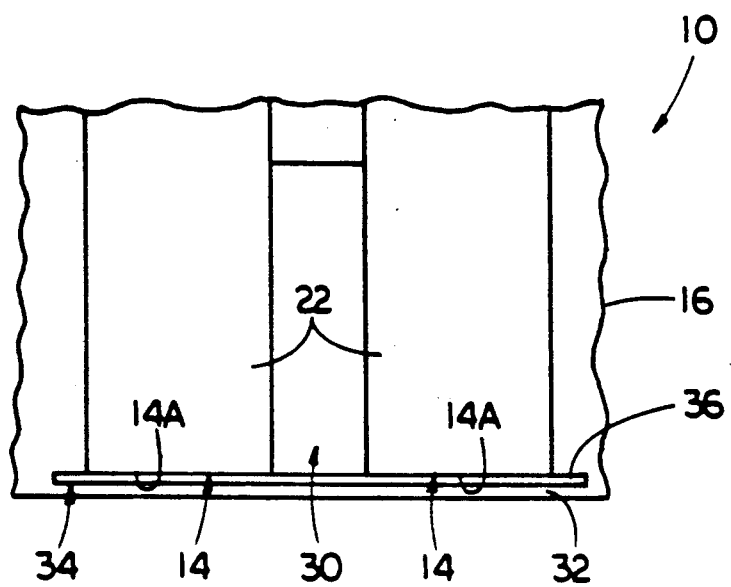
FIG. 3 is a top plan view of the TFEL edge emitter structure of FIG. 2.

Referring to FIGS. 1-3, there is also illustrated an uniform light emission filter 34 of the present invention provided across the front light-emitting edge faces 14A of the linear array of spaced-apart pixels 14 of the EL stack 12. As earlier mentioned in the background section supra, due to inherent manufacturing deviations the material of the light generating layer 28 of the EL stack 12, light of non-uniformity intensity is emitted through the front edge faces 14A of the pixels 14 from different regions of each of the faces. The filter 34 has been devised to compensation for this non-uniformity of the EL stack 12.

More particularly, the uniform light emission filter 34 can take two alternative forms. In FIG. 1, the filter 34 takes the form of a conventional photographic emulsion deposited or applied directly to the light-emitting faces 14A of the pixels, such as by being coated thereon. In FIGS. 2 and 3, the filter 34 takes the form of a separate substrate 36, such as a photographic negative film, containing the exposed photographic emulsion and mounted across the light-emitting faces 14A of the pixels 14. In the case of both embodiments, the emulsion is exposed to the pattern of light emitted by the different regions of the pixel faces 14A to produce a gray-type filter in front of the edge emitter structure 10. The emulsion is exposed by turning on the pixels 14 of the edge emitter structure 10 under actual operating conditions for a predetermined time period. The filter 34 is then used in the same exact position relative to the front edge faces 14A of the pixels 14 as when it was exposed.

The exposed emulsion of the filter 34 is translucent but darker at regions thereof which correspond to regions of the light-emitting edge faces 14A of the pixels 14 which emit light of higher intensity relative to other regions and lighter at regions thereof which correspond to regions of the light-emitting edge faces 14A of the pixels 14 which emit light of lower intensity relative to other regions. The final exposed emulsion of the filter 34 reduces the original non-uniform intensity of the light emitted from different regions of the light-emitting pixels faces 14A to an uniform level equal to that of the lowest original light intensity of the pixel light-emitting faces 14A.

Figure 4:
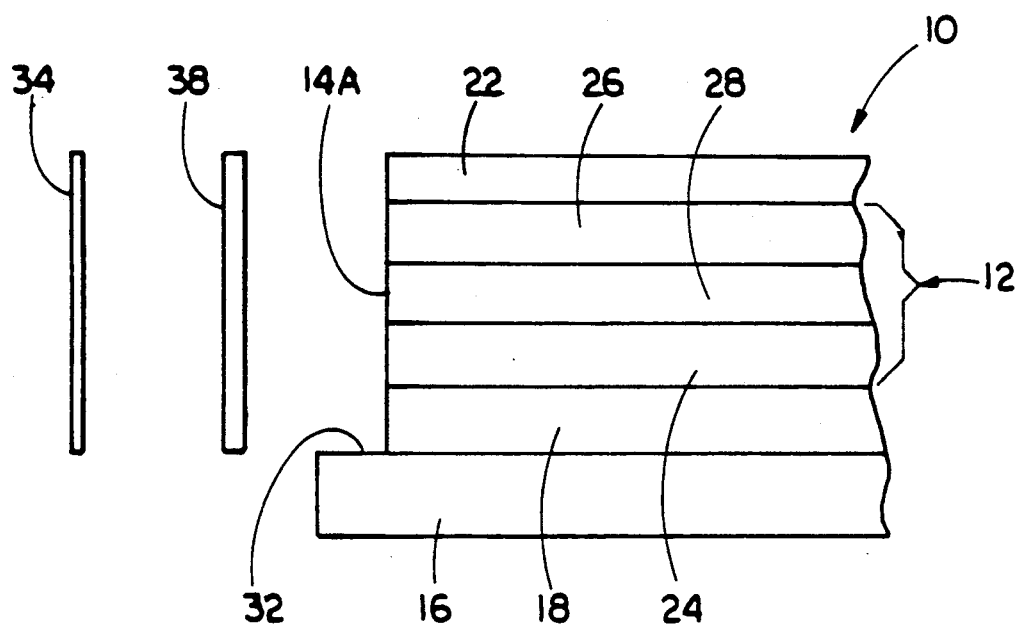
FIG. 4 is a fragmentary longitudinal vertical sectional view of the TFEL edge emitter structure showing the arrangement of the filter with respect to a focussing lens and the edge emitter structure for exposing of the photographic emulsion of the filter to compensate for non-uniformities of both the lens and edge emitter structure.
Figure 5:
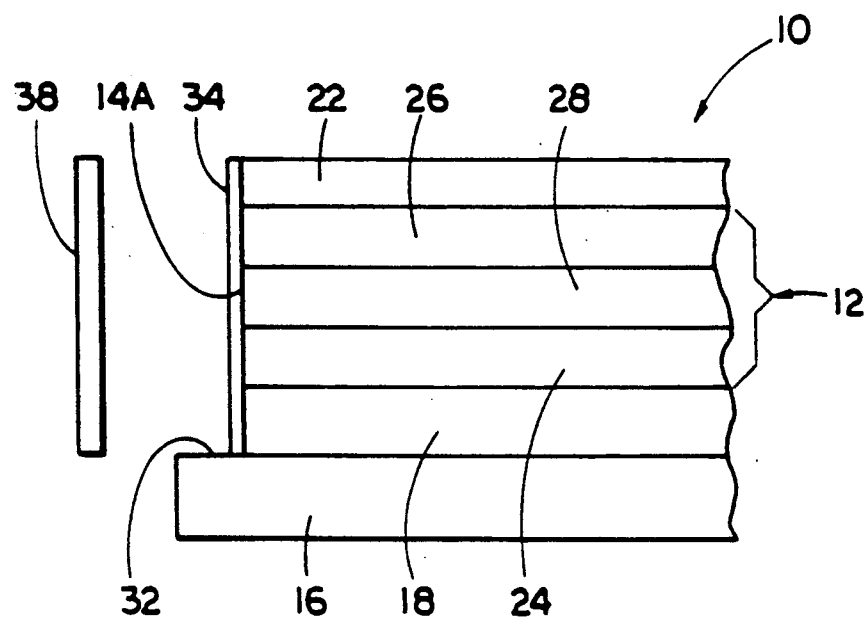
FIG. 5 is a fragmentary longitudinal vertical sectional view of the TFEL edge emitter structure showing the arrangement of the filter with respect to the lens and edge emitter structure after exposing of the photographic emulsion of the filter is completed.

Referring to FIGS. 4 and 5, a focussing lens 38 can be combined with the edge emitter structure 10 and the filter 34. In this case, the emulsion of the filter 34 is exposed so as to compensate not only for non-uniformity intensity of the light emitted by the faces 14A of the pixels 14 but also for optical non-uniformities of the focussing lens 38 which result in passing of different intensities of light through different regions of the lens 38. FIG. 4 illustrates the arrangement of the filter 34 spaced in front of the focussing lens 38 at the focal plane thereof for exposing of the photographic emulsion of the filter 34 to compensate for non-uniformities of both the lens 38 and the material of the light generating layer 28 of edge emitter structure 10. FIG. 5 illustrates the arrangement of the filter 34 in the operating position adjacent to the light emitting faces 14A of the pixels 14 after exposing of the photographic emulsion of the filter has been completed. The filter 34 can take either of the two alternative forms discussed above.

Figure 6:
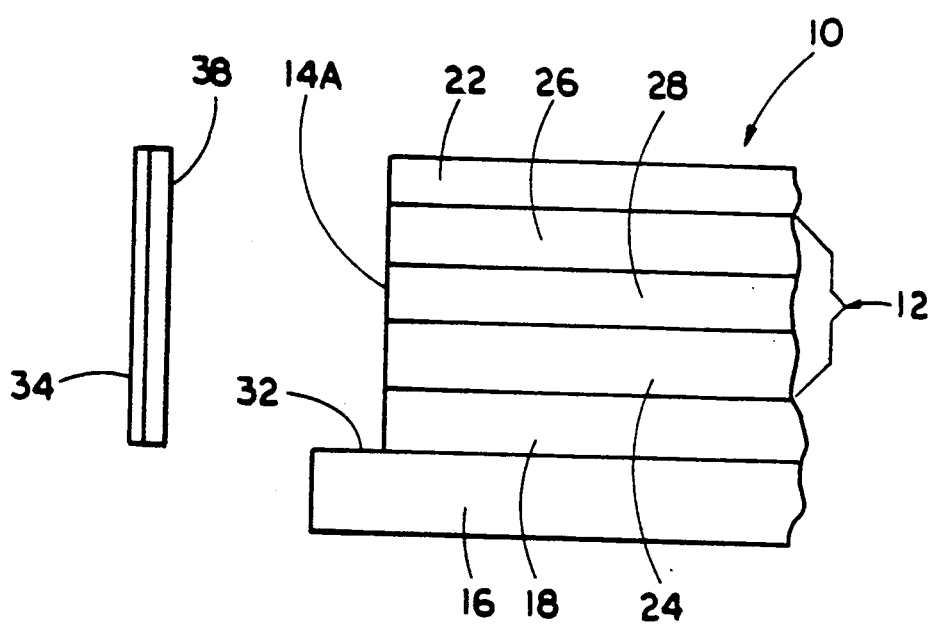
FIG. 6 is a view similar to FIGS. 4 and 5, but with the filter being applied directly to the focussing lens.

FIG. 6 shows a different arrangement of the filter 34 wherein a focussing lens 38 is combined with the edge emitter structure 10. Here the filter 34 is in the form of a photographic emulsion deposited or applied directly to the face of the focussing lens 38 as a coating. Alternatively, the filter 34 could be in the form of a separate substrate, such as substrate 36, which is mounted to the face of the focussing lens 38.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

What is claimed is:

1. In combination with a light-emitting edge structure having an edge face emitting light of non-uniform intensity from different regions of said face, an uniform light emission filter, comprising:
   (a) an exposed photographic emulsion disposed adjacent to said light-emitting edge face of said structure;
   (b) said emulsion being darker at regions thereof which correspond to regions of said light-emitting edge face which emit light of higher relative intensity and lighter at regions thereof which correspond to regions of said light-emitting edge face which emit light of lower relative intensity such that said exposed emulsion reduces the non-uniform intensity of light emitted by said different regions of said edge face to an uniform level equal to that of the lowest light intensity thereof.

2. The filter as recited in claim 1, wherein said emulsion is coated directly on said light-emitting face of said edge structure.

3. The filter as recited in claim 1, further comprising:
   a separate substrate containing said exposed photographic emulsion and being mounted across said light-emitting face of said edge structure.

4. The filter as recited in claim 3, wherein said substrate is a photographic negative film.

5. In combination with a thin film electroluminescent (TFEL) edge emitter structure with an electroluminescent (EL) stack having an edge face emitting light of non-uniform intensity from different regions of said face, an uniform light emission filter, comprising:
   (a) an exposed photographic emulsion disposed adjacent to said light-emitting edge face of said structure;
   (b) said emulsion being darker at regions thereof which correspond to regions of said light-emitting edge face which emit light of higher relative intensity and lighter at regions thereof which correspond to regions of said light-emitting edge face which emit light of lower relative intensity such that said exposed emulsion reduces the non-uniform intensity of light emitted by said different regions of said edge face to an uniform level equal to that of the lowest light intensity thereof.

6. The filter as recited in claim 5, wherein said emulsion is coated directly on said light-emitting face of said edge structure.

7. The filter as recited in claim 6, further comprising:
   a separate substrate containing said exposed photographic emulsion and being mounted across said light-emitting face of said edge structure.

8. The filter as recited in claim 7, wherein said substrate is a photographic negative film.

9. In combination with a light-emitting edge structure and a focussing lens, said edge structure having an edge face emitting light of non-uniform intensity from different regions of said face, said lens being disposed adjacent said light-emitting edge face, an uniform light emission filter, comprising:
   (a) an exposed photographic emulsion disposed adjacent to said focussing lens and said light-emitting edge face of said structure;
   (b) said emulsion being darker at regions thereof which correspond to regions of said light-emitting edge face and said lens which respectively emit and pass light of higher relative intensity and lighter at regions thereof which correspond to regions of said light-emitting edge face and lens which respectively emit and pass light of lower relative intensity such that said exposed emulsion reduces the non-uniform intensity of light emitted by said different regions of said edge face and said lens to an uniform level equal to that of the lowest light intensity thereof.

10. The filter as recited in claim 9, wherein said emulsion is coated directly on said light-emitting face of said edge structure.

11. The filter as recited in claim 9, further comprising:
a separate substrate containing said exposed photographic emulsion and being mounted across said light-emitting face of said edge structure.

12. The filter as recited in claim 11, wherein said substrate is a photographic negative film.

13. The filter as recited in claim 9, wherein said emulsion is coated directly on said focussing lens.

14. The filter as recited in claim 9, further comprising:
a separate substrate containing said exposed photographic emulsion and being mounted across said focussing lens.

15. The filter as recited in claim 14, wherein said substrate is a photographic negative film.

* * * * *